United States Patent [19]

Birdwell et al.

[11] Patent Number: 5,002,810
[45] Date of Patent: Mar. 26, 1991

[54] ORNAMENT RETENTION SYSTEM

[75] Inventors: Richard L. Birdwell, Tecumseh; James H. Carbary, Roseville, both of Mich.

[73] Assignee: Babcock Industries, Inc., Fairfield, Conn.

[21] Appl. No.: 470,970

[22] Filed: Jan. 26, 1990

[51] Int. Cl.$^5$ .................................... B60R 13/00
[52] U.S. Cl. .................................... 428/31; D12/197; 40/591; 280/727; 411/429
[58] Field of Search .................. D12/197; 40/591; 280/727; 411/429; 428/31

[56] References Cited

U.S. PATENT DOCUMENTS

| | | | |
|---|---|---|---|
| 3,968,977 | 7/1976 | Wilfert | 428/31 X |
| 4,349,591 | 9/1982 | Kanamori | 428/31 |
| 4,400,417 | 8/1983 | Kanamori et al. | 428/31 |
| 4,646,208 | 2/1987 | Hayashi et al. | 428/31 X |

FOREIGN PATENT DOCUMENTS 1133297 11/1968 United Kingdom ................ 428/31

Primary Examiner—Henry F. Epstein
Attorney, Agent, or Firm—Barnes, Kisselle, Raisch, Choate, Whittemore & Hulbert

[57] ABSTRACT

An ornament retention system comprises an ornament having a base. A mounting element is engaged by the base and a tubular connecting rod is connected to the base by a wire. The wire extends through the rod and is fixed to the rod. A tube surrounds the rod. The tube is interconnected to the mounting element. A stop member is provided on the end of the rod and a spring surrounds the rod end and is interposed between the mounting element and the stop member.

12 Claims, 3 Drawing Sheets

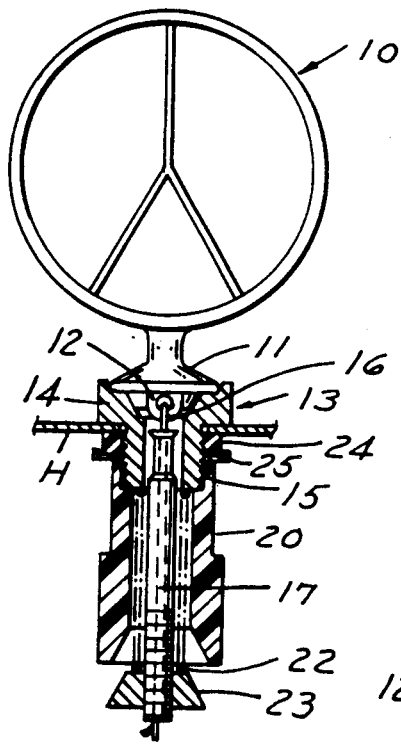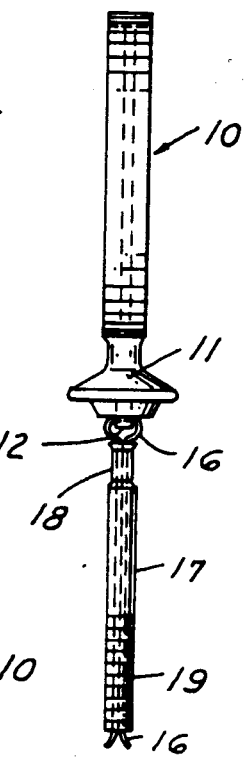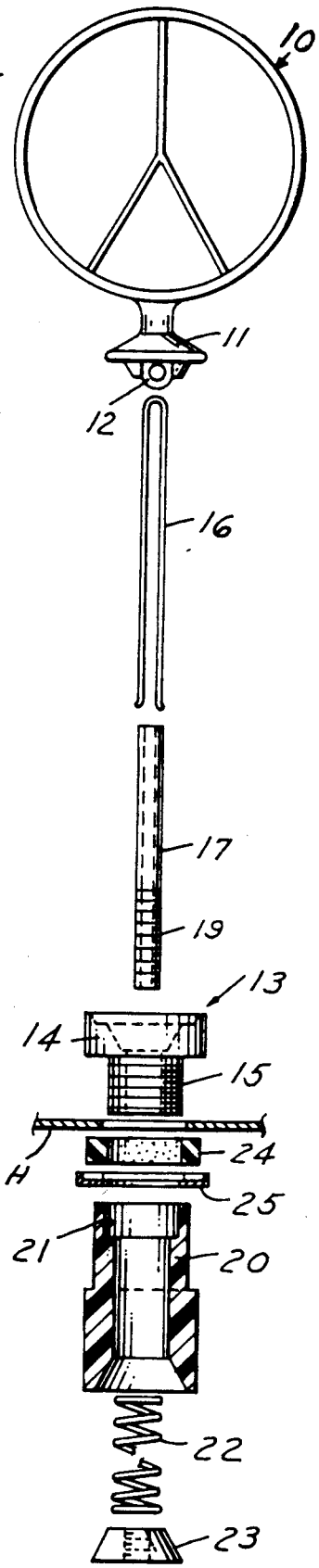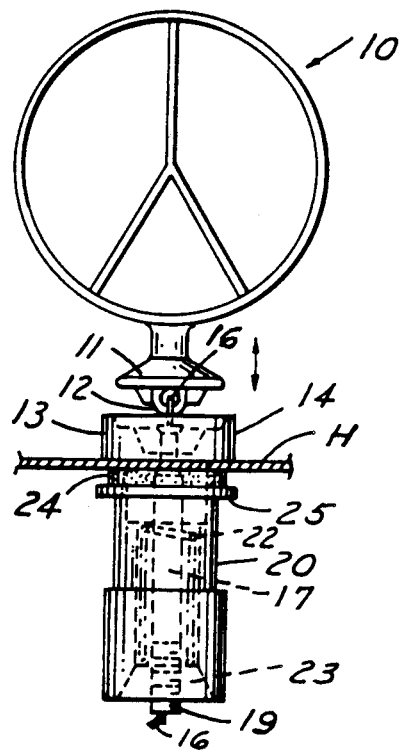

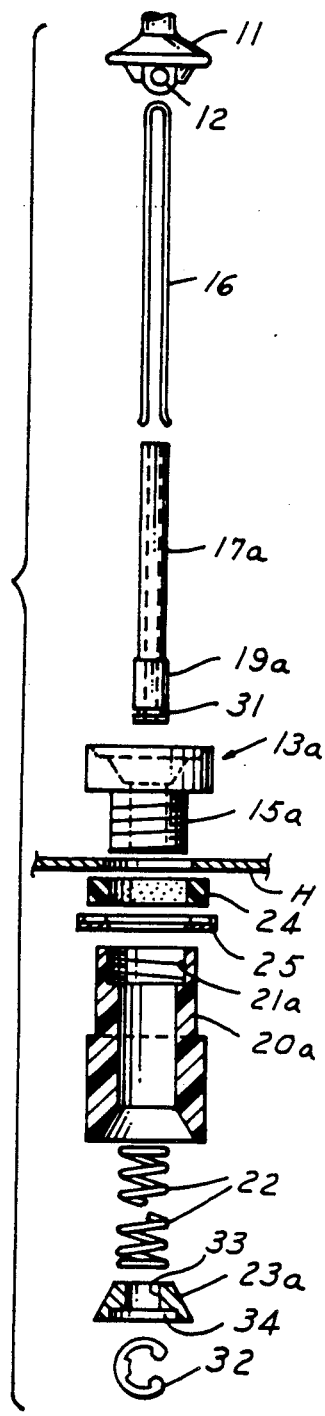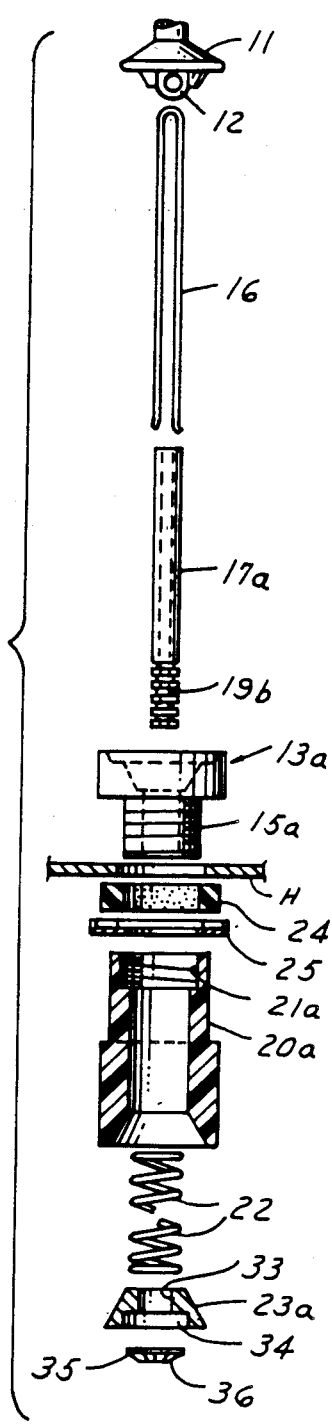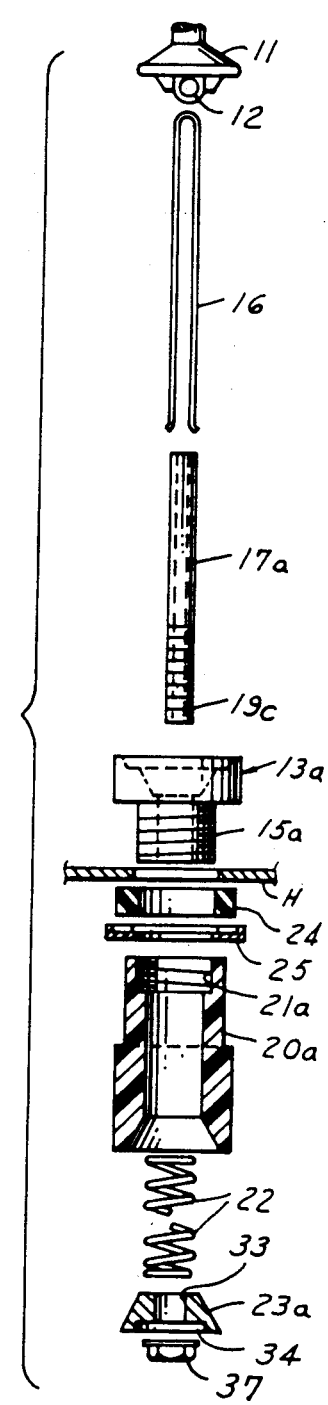

ORNAMENT RETENTION SYSTEM

This invention relates to ornament retention systems.

BACKGROUND AND SUMMARY OF THE INVENTION

It is common in automotive vehicles to have a hood ornament. One common type of mounting system for a hood ornament comprises connecting a wire to a fixed loop on the hood ornament. The wire is passed through a spring and hooks on the bottom of the spring. The extent of deflection or compression of the spring determines the amount of deflection of the hood ornament upon encountering an obstacle. One of the most common problems with such an ornament retention system is that the wire is readily accessible and can be cut or otherwise deformed by thieves or vandals.

Among the objectives of the present invention are to provide an ornament retention system which is not readily broken by thieves or vandals; which will permit proper functioning and the required degree of deflection without exposing parts sufficiently so that they can readily be severed; wherein the amount of deflection is pre-selected to prohibit theft or vandalism; and which also can be connected to operate an alarm system.

In accordance with the invention, the ornament retention system comprises an ornament having a base. A mounting element is engaged by the base and a tubular connecting rod is connected to the base by a wire. The wire extends through the rod and is fixed to the rod. A tube surrounds the rod. The tube is interconnected to the mounting element. A stop member is provided on the end of the rod and a spring surrounds the rod and is interposed between the mounting element and the stop member.

BRIEF DESCRIPTION OF THE DRAWINGS

FIG. 1 is a part sectional elevation of an ornament retention system embodying the invention.

FIG. 2 is an exploded view of the retention system.

FIG. 3 is an elevational view of a portion of the system.

FIG. 4 is an elevational view of the system showing axial deflection of the ornament.

FIG. 9 is a fragmentary exploded view of a modified form of the system.

FIG. 10 is a fragmentary exploded view of another modified form of the system.

FIG. 11 is a fragmentary exploded view of another modified form of the system.

DESCRIPTION

Figure 5:
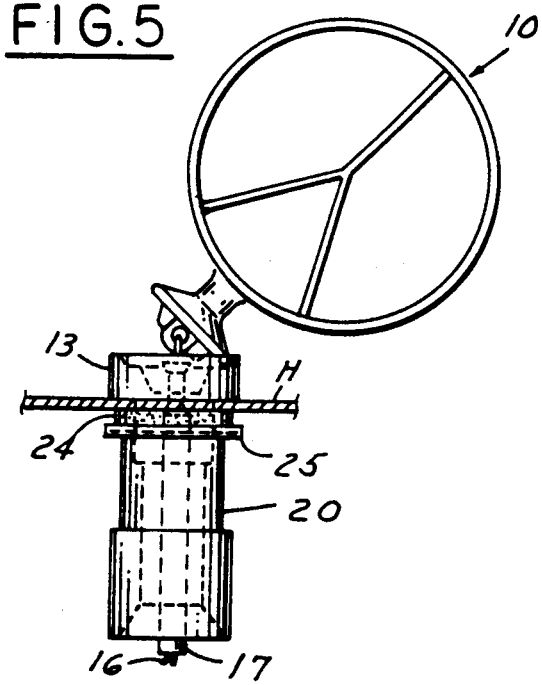
FIG. 5 is an elevational view of the system showing lateral deflection of the ornament.

Referring to FIGS. 1-5, the ornament retention system embodying the invention comprises a hood ornament 10 that has an integral base 11 with an integral downwardly extending loop 12. The ornament 10 is adapted to be mounted on a mounting element 13 which has a lateral flange 14 for engaging the surface of a body part, such as a hood H, and an axially extended portion 15 with threads that extend through an opening in the hood H. A wire 16 is looped through the loop 12 and has its ends extending through a rod 17. The wire is fastened to the upper end of the rod 17 as by crimping, as at 18. The exterior of the lower end of the rod 17 is threaded, as at 19. Alternatively, the lower end of rod 17 has at least one annular groove for accommodating various retaining clips (see FIGS. 9 and 10).

A travel-limiting tube 20 made of plastic material is provided about the rod 17 and has internal threads 21 at the upper end for threading onto the threads of the axial extension 15 of the mounting member 13. A compression spring 22 is interposed between the lower end of the axial extension 15 surrounding the rod 17 and a stop member 23 is threaded on the threads 19 on the lower end of the rod 17 thereby controlling the degree of compression of the spring 22 and provide a preselected amount of deflection for the hood ornament 10. A resilient annular washer 24 is provided on the underside of hood H and a sheet metal lock washer 25 which resists rotation is provided on the underside of the resilient washer 24 and above the upper end of the tube 20 to lock the mounting member 13 in position. The stop member 23 is normally out of engagement with the tube 20 (FIG. 1).

An alternate embodiment of this invention is illustrated in FIG. 9. In the description of this form, similar parts are identified with similar numbers with the suffix "a". In this embodiment, mounting element 13a has an axial extending portion 15a which is press fit into a bore 21a of travel-limiting tube 20a to capture hood H, washer 24 and washer 25. This embodiment allows for the coupling of travel-limiting tube 20a to a shorter axial extending portion 15a of mounting element 13a.

In this alternate embodiment, rod 17a has on its lower end with one of three alternative configurations for limiting the amount of deflection of the hood ornament 10 as illustrated in FIGS. 9, 10 and 11. FIG. 9 illustrates an enlarged end 19a having an annular groove 31 for a snap ring clip 32 on the lower end of rod 17a. The stop member 23a has a through bore 33 and a recess 34 on its lower end. Enlarged end 19a is press fit into bore 33 so that the groove 31 extends into recess 34 so that snap ring 32 may engage groove 31. This combination of the press-fit engagement and the snap ring 32 holds stop member 23a to rod 17a.

FIG. 10 illustrates rod 17a having a lower end with a number of shallow annular grooves 19b. This lower end of rod 17a passes through bore 33 of stop member 23a and into engagement with push-on clip 35. Push-on clip 35 has a number of downwardly bent radially inward fingers 36 which engage one of the shallow grooves 19b to hold stop member 23a to rod 17a. The amount of axial and lateral deflection of hood ornament 10 will depend on which groove 19b is engaged by clip 35. The farther the groove 19b is from the lower end of rod 17a the smaller the deflection of hood ornament 10 will be.

Another alternative for holding stop member 23a to rod 17a is illustrated in FIG. 11. The lower end of rod 17a is threaded, as at 19c. This threaded portion 19c passes through bore 33 of stop member 23a and is received by the internal threads of lock nut 37 or push-on clip 35. The position of the lock-nut 37 or push-on clip 35 on end 19c determines the amount of axial and lateral deflection of the hood ornament 10.

As shown in FIGS. 4 and 5, either axial deflection or lateral deflection of the ornament 10 is readily obtained, but without exposing enough of the wire so that it can readily be cut by vandals or thieves. In each instance, the stop member 23, 23a limits the movement such that a minimal portion of the wire 16 is exposed.

Figure 6:
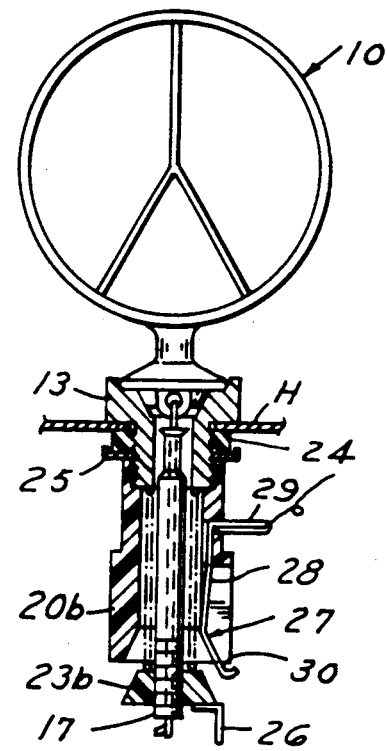
FIG. 6 is a part sectional elevational view of a modified form of the system.
Figure 8:
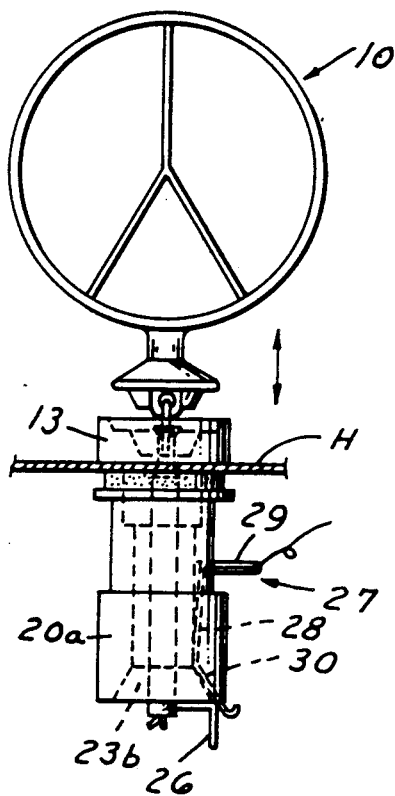
FIG. 8 is a view similar to FIG. 7 showing the relative positions of the parts upon axial movement of the ornament.
Figure 7:
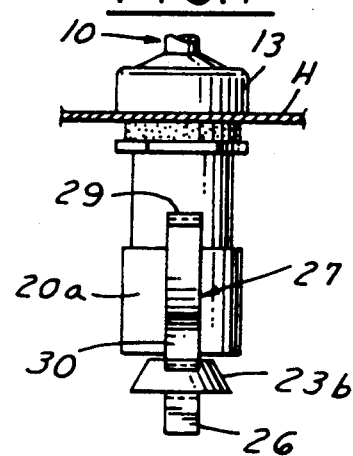
FIG. 7 is fragmentary side elevational view of the system shown in FIG. 6.

In the form of the invention shown in FIGS. 6-8 the ornament retention system is modified to include provision for an alarm completed by a circuit to a horn or other similar device. In the description of this form, similar parts are identified with similar numbers with the suffix "b". As shown in FIGS. 6-8, an electrical contact 26 is provided on the fastener 23b, preferably molded into a plastic stop member 23b, and includes an axially extending portion that is adapted to engage the end 27 of an electrical contact on the tube 20b. The contact 27 includes an axial portion 28, a laterally extending portion 29 at its upper end for connection to an electrical wire, and a downwardly and outwardly extending portion 30 for completing the circuit. As shown in FIG. 8, any deflection of the ornament 10 will cause the contact 26 to move axially and engage the contact 30 completing a circuit to an alarm or horn.

It can thus be seen that there has been provided an ornament retention system which is not readily broken by thieves or vandals; which will permit proper functioning and the required degree of deflection without exposing parts sufficiently so that they can readily be severed; wherein the amount of deflection is preselected to prohibit theft or vandalism; and which also can be connected to operate an alarm system.

We claim:

1. An ornament retention system comprising:
   an ornament having a base,
   a mounting element normally engaged by said base and having an opening therethrough.
   means for mounting said mounting element on one surface of a body part,
   a tubular connecting rod,
   a wire connected to said base and extending through said opening in said mounting element and said tubular rod and fixed to said tubular rod,
   a travel-limiting tube through which the tubular rod extends,
   a stop member on the end of said tubular rod, and
   a spring means yieldingly urging said stop member and said tubular rod to cause said base of said ornament to engage said mounting element, said tube limiting movement of said ornament axially and laterally away from said mounting element.

2. The ornament retention system set forth in claim 1 wherein said travel-limiting tube is made of plastic material.

3. The ornament retention system set forth in claim 1 wherein said stop member is threaded onto said rod.

4. The ornament retention system set forth in claim 1 including a means for retaining said stop member onto said rod.

5. The ornament retention system set forth in claim 4 wherein said retaining means comprises an enlarged end on said rod, an annular groove on enlarged end of said rod and a snap ring clip engaging said groove.

6. The ornament retention system set forth in claim 1 wherein said retaining means comprises a plurality of shallow annular grooves on the end of said rod and a push-on clip having flexible extending fingers engaging one of said grooves.

7. The ornament retention system set forth in claim 4 wherein said retaining means comprises threads on the end or said rod and a lock nut threaded onto said threads of said rod.

8. The ornament retention system set forth in claim 1 wherein said spring means comprises a compression spring interposed between the mounting member and said stop member.

9. The ornament retention system set forth in claim 1 wherein said means fixing said wire to said rod comprises potions of said rod crimped about said wire.

10. The ornament retention system set forth in claim 1 including an electrical contact on said tube, an electrical contact on said stop member, said contacts being adapted to be engaged upon predetermined movement of said ornament relative to said mounting member to produce a signal.

11. The ornament retention system set forth in claim 1 wherein said stop member is made of a plastic material and said electrical contact is molded on said plastic stop member.

12. The ornament retention system set forth in claim 1 including an electrical contact on said tube, said stop member being made of a zinc, said contact and said stop member being adapted to be engaged upon predetermined movement of said ornament relative to said mounting member.

* * * * *